United States Patent [19]

Iwata et al.

[11] Patent Number: 4,612,900

[45] Date of Patent: Sep. 23, 1986

[54] ENGINE OPERATING PARAMETER CONTROL APPARATUS

[75] Inventors: Toshio Iwata; Satoshi Komurasaki; Atsushi Ueda, all of Himeji, Japan

[73] Assignee: Mitsubishi Denki Kabushiki Kaisha, Tokyo, Japan

[21] Appl. No.: 703,387

[22] Filed: Feb. 20, 1985

[30] Foreign Application Priority Data

Feb. 24, 1984 [JP] Japan .................. 59-34572
Mar. 22, 1984 [JP] Japan .................. 59-56711

[51] Int. Cl.$^4$ .............................. F02P 5/15
[52] U.S. Cl. .................. 123/425; 60/602; 123/435
[58] Field of Search .......... 123/425, 435, 564; 73/35; 60/602

[56] References Cited

U.S. PATENT DOCUMENTS 3,822,583 7/1974 Keller et al.
4,387,571 6/1983 Katsumata et al. ............... 60/602
4,450,810 5/1984 Wada et al. ................... 123/435 X
4,463,565 8/1984 Rydquist et al. ............... 123/425 X
4,466,406 8/1984 Hartung et al. ................ 123/435 X

FOREIGN PATENT DOCUMENTS 28559 2/1983 Japan ................ 123/425
57-072 4/1983 Japan .
143169 8/1983 Japan ................ 123/425

Primary Examiner—Tony M. Argenbright
Attorney, Agent, or Firm—Leydig, Voit & Mayer, Ltd.

[57] ABSTRACT

A control apparatus for an internal combustion engine in which the condition of the operating parameters of the engine is changed over according to the detected result of the occurrence of knocks only when the engine lies in a predetermined operating region. The operating parameters include an ignition timing, a supercharging pressure, a compression ratio, and an air/fuel ratio. The knocks of the engine are integrated and compared with a threshold level to determine which of premium or regular gasoline is being used. In this determination, if the operating region lies in said predetermined operating region, the condition of the operating parameters is changed over. The predetermined operating region is defined by a load information and a speed information of the engine.

14 Claims, 28 Drawing Figures

4,612,900

ENGINE OPERATING PARAMETER CONTROL APPARATUS

BACKGROUND OF THE INVENTION

This invention relates to a control apparatus for an internal combustion engine, and in particular to a control apparatus for the operating parameters such as an ignition timing, a supercharging pressure, an air/fuel ratio, and a compression ratio of an internal combustion engine which is operable either with a low-octane rating fuel or a high-octane rating fuel.

It is well known in the art that the octane rating of fuel gasoline is greatly interrelated with a knock-resistibility in an internal combustion engine. Namely, as the octane rating of gasoline becomes higher, the knocking of an engine correspondingly decreases.

FIG. 1 shows an ignition timing vs output shaft torque characteristic of an internal combustion engine in the case where a commercially available low-octane gasoline (regular gasoline) and a commercially available high octane gasoline (premium gasoline) of which the octane rating is higher than that of low-octane gasoline are used. In the figure, point A indicates a knock limit for the low-octane gasoline while point B indicates a knock limit for high-octane gasoline, in which knock arises when the angle of the ignition timing is advanced beyond these points.

According to FIG. 1, it is possible to advance the angle of the ignition timing up to a point B when the high-octane gasoline is used, where the output shaft torque will be higher as compared with the use of the low-octane gasoline.

FIG. 2 shows a supercharging pressure vs output shaft torque characteristic of an engine associated with a supercharger. Similar to FIG. 1, point A represents a knock limit when using the regular loc-octane gasoline and point B represents a knock limit when using the premium high-octane gasoline. It will be seen from FIG. 2 that the increase of a supercharging pressure when premium gasoline is used for the engine enables the output shaft torque of the engine to be also increased as in FIG. 1.

Therefore, in an engine associated with such a characteristic, in the case where the regular and the premium gasolines are alternatively used, if the operating parameters of an engine such as the ignition timing and the spercharging pressure are changed over to have an optimum value according to the kind of a gasoline in use, the output of the engine can be enhanced.

However, in a conventional control apparatus for an internal combustion engine, the reference ignition timing characteristic and the reference supercharging characteristic and the like are preset only for a predetermined octane rating gasoline, e.g. the low-octane rating gasoline. Therefore when the gasoline of the engine is changed over from the low octane rating gasoline to the high octane rating gasoline, an increase in the output of the engine can not be expected without any change or modification thereof, so that the presetting, e.g. of the reference ignition timing and the reference supercharging pressure must be repeated respectively towards the advance angle and the increased pressure, by some method.

It has been also considered that by means of a knock control technique, which will be hereinafter described in the embodiments of this invention, for detecting engine knocks and controlling the ignition timing to the knock occurrence limit, the reference ignition timing characteristic is preset to point B in FIG. 1 for the premium gasoline and when regular gasoline is in use, the ignition timing is retarded to point A in FIG. 1 by means of the above knock control technique. In this case, however, because of the broad ignition timing interval for a knock control between points A and B in FIG. 1, when knocks arise during an acceleration operation etc., of the engine, intense knocks disadvantageously arise during the retarding shift of the ignition timing from point B to point A in FIG. 1.

Even if the reference ignition timing, etc., have been again preset at the knock limit A or B, since the knock limits A and B in FIG. 1 vary with environmental conditions during the operation of the engine such as temperature, humidity, etc, there is a possibility that knocks will arise due to variation in such environmental conditions.

Furthermore, depending on the operating region of the engine, there is a case where an accurate determining operation of octane rating can not be done.

U.S. Pat. No. 3,822,583, titled "Method for Determining Octane Rating of Fuels under Road Conditions" discloses measuring the octane rating of a fuel used for an engine by the detection of knocks.

Japanese Patent Application Laid-open No. 58-57072, published on Apr. 5, 1983, titled "Method for Controlling Ignition Timing of Electronic Controlled Engine" discloses a change-over ignition timing apparatus for an engine depending on the octane rating of a fuel.

SUMMARY OF THE INVENTION

It is accordingly an object of the present invention to provide a control apparatus for an internal combustion engine wherein the condition of the operating parameter of the engine can be accurately changed over by the combination of a knock sensing operation and an operating region determining operation and the responsiveness of a knock control is improved by making narrower the ignition timing change-over interval of a knock control.

It is another object of the invention to provide a control apparatus for an internal combustion engine wherein an erroneous and instantaneous determination of the change-over of the condition of the operating parameter is precluded.

In order to accomplish this object, a control apparatus for an internal combustion engine according to the present invention broadly comprises: a sensing means for sensing vibrations including knocks in the engine; knock signal deriving means for deriving knock signals from the output of the sensing means; a correction magnitude determining means for determining from said knock signals derived by said knock signal deriving means an ignition timing correction magnitude for suppressing the occurrence of knock; an operating parameter condition sensing means; an operating parameter change-over determining means for determining a knock condition of the engine associated with a fuel used for the engine from the ignition timing correction magnitude and an operating parameter condition of the engine from said operating parameter condition sensing means; a storage means for storing the output of the operating parameter change-over determining means; and an operating parameter change-over means for controllably changing over the condition of the operating parameter of the engine to suppress said knocks of the engine, in accordance with the output of the storage means.

The operating parameter preferably comprises an ignition timing characteristic for the engine, a supercharging pressure, an air/fuel ratio, or a compression ratio.

The operating parameter change-over determining means preferably includes means for determining the change-over of the operating parameter of the engine only in a predetermined operating region of the engine. The correction magnitude determining means includes means for determining a ignition timing retard angle to shift the retard angle by a predetermined angle toward an advance angle when the output of the storage means is inverted toward the suppression of knocks. The operating parameter change-over means preferably includes a reference ignition timing signal generator for generating the reference ignition timing for gasoline with a particular octane rating, and an ignition timing controller for phase-shifting the reference ignition timing of the generator according to the outputs of the correction magnitude determining means and the storage means to control an ignition circuit connected to an ignition coil.

The operating parameter change-over determining means may include a comparing means for comparing the output of the correction magnitude determining means with a first predetermined threshold level set higher than the output of the correction magnitude determining means when premium gasoline is used, a pressure sensor for sensing the inlet air pressure of the engine, an operating region determining means responsive to the outputs of the pressure sensor and the ignition timing controller for determining the operating region of the engine, and means for logically multiplicating the outputs of the comparing means and the operating region determining means. The operating region determining means may comprise a single map of the operating region of the engine in the form of a window in which knocks may occur. The operating parameter change-over means may further includes a supercharging pressure controller responsive to the outputs of the storage means and the pressure sensor for controlling a supercharging pressure actuator connected to a waste gate valve.

Alternatively, the operating parameter change-over determining means may include a first comparing means for comparing the output of the correction magnitude determining means with a first predetermined threshold level set higher than the output of the correction magnitude determining means when a premium gasoline is used, a pressure sensor for sensing the inlet air pressure of the engine, a second comparing means for comparing the output of the correction magnitude determining means with a second predetermined threshold level set higher than the output of the correction magnitude determining means when premium gasoline is used, an operating region determining means responsive to the outputs of the pressure sensor and the ignition timing controller for determining the operating region of the engine, a first multiplication means for logically multiplying the outputs of the first comparing means and the operating region determining means, and a second multiplication means for logically multiplying the outputs of the second comparing means and the operating region determining means. The operating region determining means may comprise a superposed map of two operating regions of the engine in which knocks may occur. The storage means may comprise a flip-flop. The first and second mulitiplication means may be respectively connected to the set and the reset input terminals of the flip-flop.

It is another general object of the invention to provide a control apparatus for an internal combustion engine wherein a reference ignition timing characteristic is changed over to an optimum one in response to the determined result of the kind of fuel being used for the engine through the detection of the occurrence of knocks in the engine whereby the ignition timing interval for a knock control is shortened to enhance the responsiveness of the knock control. In this case, unless the above determined result is continuously provided for a predetermined time interval or more, the above change-over control may not be performed whereby a preventive function of erroneous change-over is provided and an exact ignition timing control for an engine. The above first and second multiplication means may be respectively connected to the set and the reset input terminals of the above flip-flop respectively through first and second timers which serve to prevent the output signals of the first and second multiplication means from being passed for a predetermined time interval.

BRIEF DESCRIPTION OF THE DRAWINGS

Throughout the figures, the same reference numerals indicate identical or corresponding portions and element.

DETAILED DESCRIPTION OF THE PREFERRED EMBODIMENTS

The present invention will now be described in detail along the preferred embodiments illustrated in the accompanying drawings.

Figure 3:
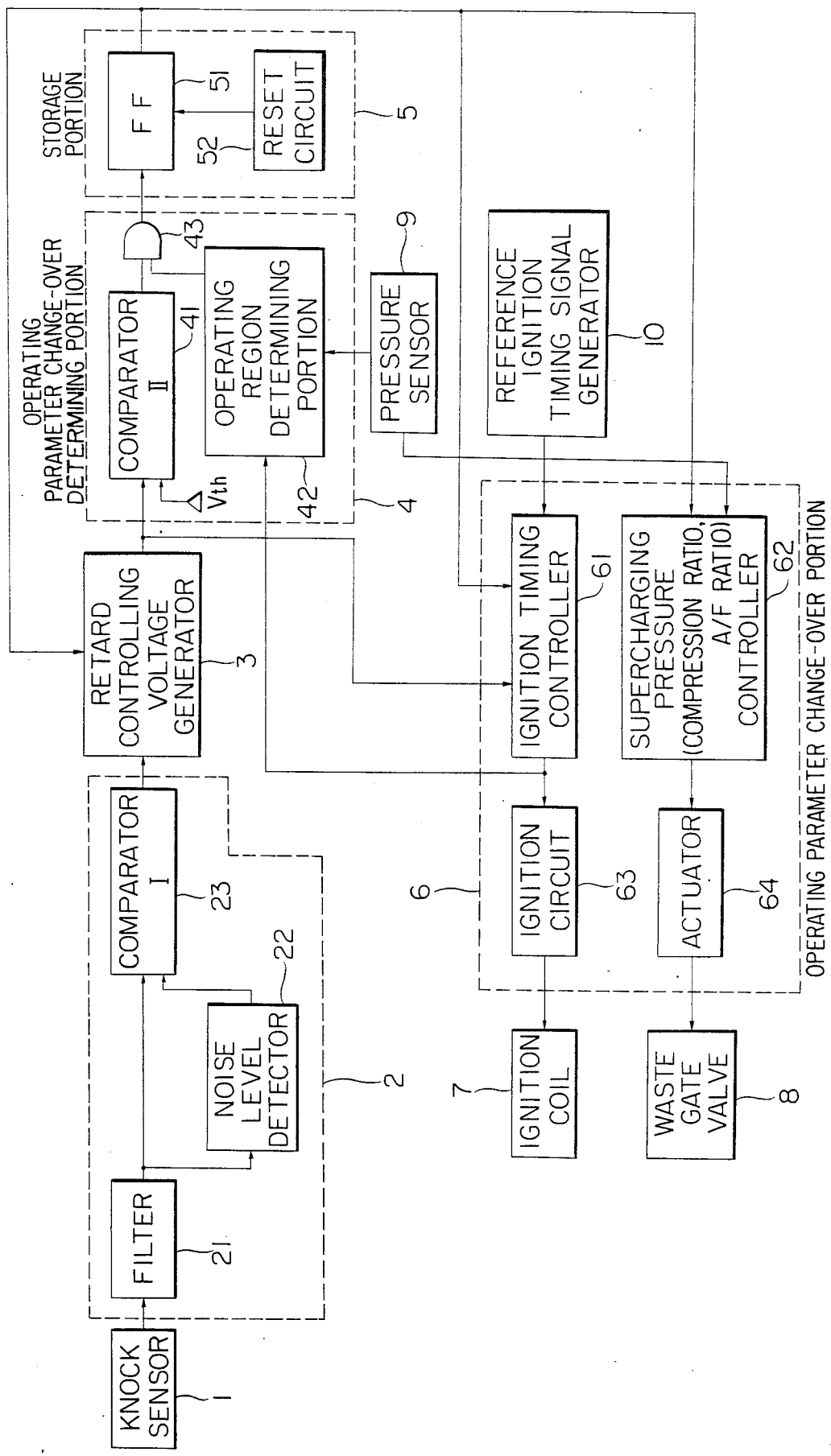
FIG. 3 shows a block diagram of a first embodiment of a control apparatus for an internal combustion engine in accordance with this invention.

FIG. 3 shows a first embodiment of this invention, where a knock sensor 1 is mounted on an internal combustion engine (not shown) to sense knocks in the engine. The output signal of the knock sensor 1 is received as an input by a knock signal deriving portion 2, enclosed with dotted lines, which is composed of a bandpass filter 21, a noise level detector 22, and a first comparator 23. The input of the bandpass filter 21 is connected to the knock sensor 1 and the output thereof is connected to the noise level detector 22 and one input of the first comparator 23. The output of the noise level detector 22 is connected to the other input of the first comparator 23.

The knock signal deriving portion 2 is connected to a retard controlling voltage generator 3. This retard controlling voltage generator is connected to an operating parameter change-over determining portion 4 which is composed of a second comparator 41, an operating region determining portion 42, and an AND gate 43. The second comparator 41 compares the output voltage of the retard controlling voltage generator 3 with a predetermined voltage level Vth to provide as an output therefrom the compared result to one input of the AND gate 43. The inputs of the operating region determining portion 42 are connected respectively to the output of an operating parameter condition sensing means, herein shown in part as a pressure sensor 9, for detecting an inlet air pressure of the engine and to the output of an ignition timing controller 61, which will be hereinafter described, while the output thereof is connected to the other input of the AND gate 43. The operating parameter change-over determining portion 4 is connected to a storage portion 5 composed of a flip-flop 51 and a reset circuit 52. The set input of the flip-flop 51 is connected to the output of the AND gate 43 and the reset input of same is connected to a reset circuit 52 while the output of same is connected to the retard controlling voltage generator 3, the ignition timing controller 61, and a supercharging pressure controller 62 which will be hereinafter described. An operating parameter change-over portion 6 which is composed of the ignition timing controller 61, the supercharging pressure controller 62, an ignition circuit 63, and an actuator 64 changes over the operating parameter such as an ignition timing and a supercharging pressure in accordance with the output of the storage portion 5. This operating parameter change-over portion 6 consists of a control portion and a drive portion. The ignition circuit 63 is connected to an ignition coil 7, and the actuator 64 is connected to a waste gate valve 8. The ignition timing controller 61 is connected to a reference ignition timing signal generator 10 whereby the controller 61 retards the reference ignition timing signal provided as an output from the generator 10 in response to the outputs of the retard controlling voltage generator 3 and of the flip-flop 51, and provides as an output therefrom an ignition signal indicative of the retarded ignition timing to the ignition circuit 63. The ignition circuit 63 causes the ignition coil 7 to develop thereacross a high voltage necessary for the ignition of the engine. The supercharging pressure controller 62 operates the actuator 64 according to the output of the flip-flop 51 to control the waste gate valve 8 mounted on the engine, thereby changing over the inlet supercharging pressure for the engine.

Figure 4:
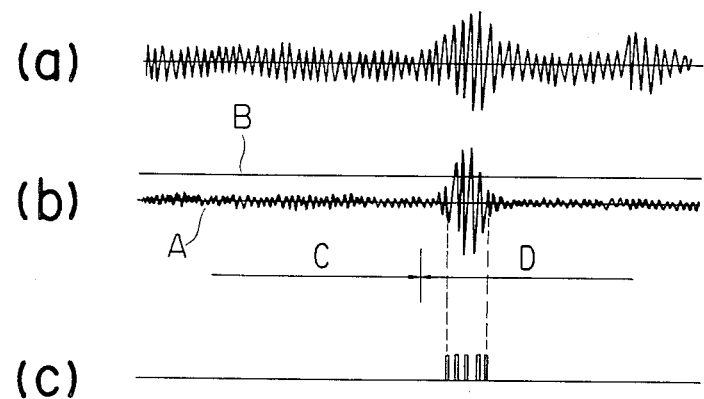
FIGS. 4a–c show waveform graphs for explaining the operation of the knock signal deriving portion in FIG. 3.

The operation of each of the block portion in FIG. 3 will now be described with reference to FIG. 4 showing waveforms indicating the operation of each of the circuits in the knock signal deriving portion 2.

The knock sensor 1 is a vibration acceleration sensor generally well known as being mounted on the cylinder block (not shown) etc., of an engine, which converts the mechanical vibration into an electrical signal, and generates a vibrating wave signal, as shown in FIG. 4(a) received by the bandpass filter 21. The bandpass filter 21 only passes therethrough a frequency component inherent in knocks, from the output signal of the knock sensor 1, thereby suppressing a noise component not relating to knocks to provide an output good in S/N ratio as shown in FIG. 4(b) by wave-form A.

The noise level detector 22 may be composed of, e.g. a half-wave rectifying circuit, an averaging circuit, and an amplifying circuit etc. The noise level detector 22 converts the output of the bandpass filter 21 (FIG. 4(b), wave-form A) into a DC voltage by the half-wave rectification and the averaging operations, the DC voltage being amplified with a predetermined amplification to have a level, as shown in FIG. 4(b) by a wave-form B, higher than the noise component of the output signal of the bandpass filter 21 (FIG. 4(b), wave-form A) but lower than the knock component of the same.

The comparator 23 compares the output signal of the noise level detector 22 (FIG. 4(b), wave-form B) with the output of the bandpass filter 21 (FIG. 4(b), wave-form A). In the case where no knock occurs (FIG. 4, section C), since the output signal of the bandpass filter 21 (FIG. 4(b), wave-form A) is not greater than the output signal of the noise level detector 22 (FIG. 4(b), wave-form B), the comparator 23 provides no output, while in the case where knocks occur (FIG. 4, section D), since the former signal is greater than the latter signal, the comparator 23 provides as an output therefrom a pulse train as shown in FIG. 4(c). Accordingly, the output pulse train from the comparator 23 can be used for determining whether or not knocks have occurred.

Figure 5:
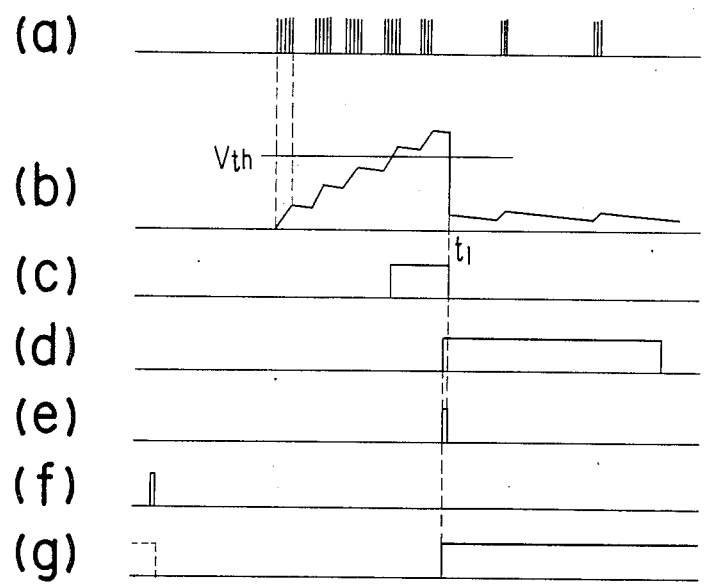
FIGS. 5a–g show waveforms graphs for explaining the operations of the various portions of the control apparatus used in FIG. 3.

FIG. 5 shows waveforms indicating the operations of the retard controlling voltage generator 3, the operating parameter change-over determining portion 4, and the storage portion 5. The retard controlling voltage generator 3 may be composed of e.g. an integration circuit which, when the first comparator 23 provides as an output therefrom a pulse train as shown in FIG. 5(a), integrates the pulse train to raise the output voltage as shown in FIG. 5(b). On the other hand, when the first comparator 23 provides no output pulse train, indicating the absence of knocks, the output of the voltage generator 3 gradually falls at a predetermined rate. Consequently, the voltage generator 3 generates a retard controlling voltage for retarding the ignition timing up to the knock limit point on a real time basis, whereby the ignition timing controller 61 receives as an input the retard controlling voltage to retard the angle of the ignition timing, thereby suppressing the occurrence of knocks.

On the other hand, the output level of the second comparator 41 is inverted from a low level to a high level as shown in FIG. 5(c) when the retard controlling voltage from the voltage generator 3 exceeds a predetermined threshold level Vth. This threshold level Vth is predetermined such that in the case where the reference ignition timing is preset for that of premium gasoline, the retard controlling voltage does not go above Vth when premium gasoline is used while it does not go below Vth when regular gasoline is used.

However, even though such a threshold level is preset to determine which of premium or regular gasoline is used for the engine, this determination can not be necessarily applied to the overall operating region of the engine because for example, in a light load region and in a low speed region the retard controlling voltage may erroneously go above Vth even when premium gasoline is used. For the purpose of eliminating such an erroneous determination, the operating region determining portion 42 is provided. The operating region determining portion 42 receives an operating load information of the engine from the pressure sensor 9 and an operating speed information of the engine through a frequency-voltage conversion of the ignition signal from the ignition timing controller 61 to form a data map for the operating region based on the load and the spped of the engine.

Figure 6:
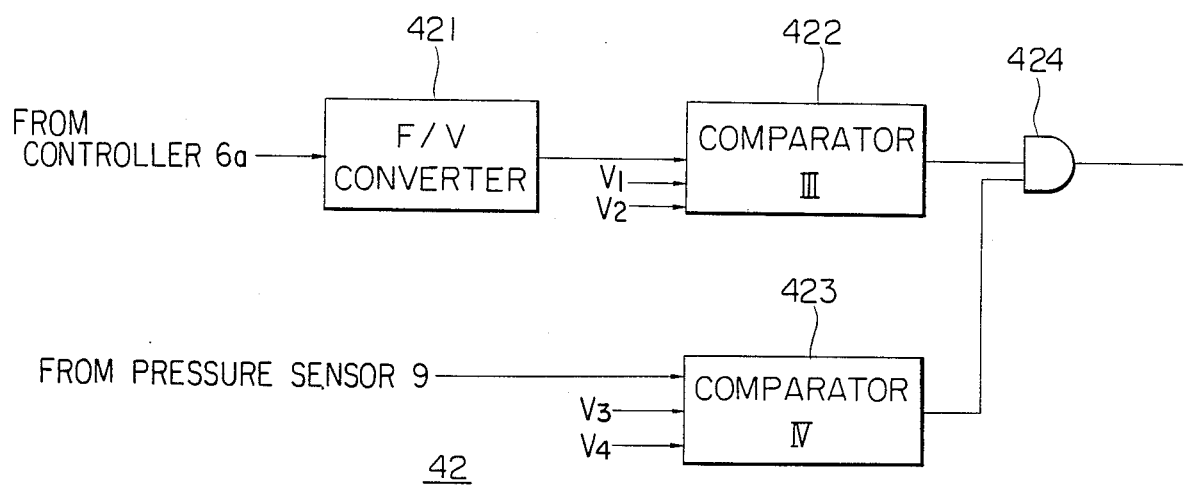
FIG. 6 shows a block diagram of the arrangement of the operating region determining portion used in FIG. 3.

In FIG. 6, there is shown a block diagram of the arrangement of the operating region determining portion 42 which is composed of a frequency-voltage converter 421, a third comparator 422, a fourth comparator 423, and an AND gate 424. The input of the F/V converter 421 is connected to the output of the ignition timing controller 61 to convert the ignition signal to a voltage in a frequency-voltage conversion fashion, that is to provide as an output therefrom a voltage proportional to the engine speed. The comparator 422 has connected thereto two threshold levels V1 and V2 to be compared with the output voltage of the F/V converter 421. When the output voltage of the F/V converter 421 is present between V1 and V2, the comparator 422 provides as an output therefrom a high level signal while otherwise it provides as an output therefrom a low level signal. One input of the comparator 423 is connected to the output of the pressure sensor 9 to receive as an input a voltage proportional to the inlet air pressure of the engine, that is the load information of the engine. The comparator 423 also has connected thereto two threshold levels V3 and V4 to be compared with the output voltage of the pressure sensor 9. When the output voltage of the pressure sensor 9 is present between V3 and V4, the comparator 423 provides as an output therefrom a high level signal while otherwise it provides as an output therefrom a low level signal. The AND gate 424 performs the logical multiplication of the outputs of the comparators 422 and 423.

Figure 7:
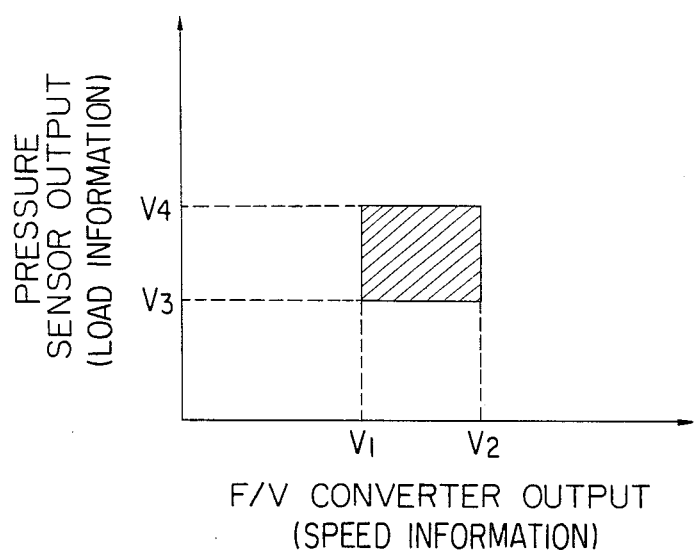
FIG. 7 shows a map of an operating region of the engine defined by a load information and a speed information, used in the first embodiment of this invention.

FIG. 7 shows an operating region of the engine represented by the output voltage of the F/V converter 421 (speed information) and the output voltage of the pressure sensor 9 (load information). The hatched portion which is called a "map" designates a predetermined speed region of V1–V2 as well as a predetermined load region of V3–V4. If the engine resides in this operating region, then the operating region determining portion 42 provides as an output therefrom a high level signal as shown in FIG. 5(d).

Therefore, in the case where the reference ignition timing is preset for premium gasoline in the signal generator 10, when the retard controlling voltage exceeds Vth, indicating that regular gasoline is used for the engine, and when the operating condition of the engine lies in the map shown in FIG. 7, the AND gate 43 provides as an output therefrom a high level signal, as shown in FIG. 5(e).

Thus, the AND gate 43 provides as an output therefrom a signal accurately indicative of whether premium gasoline or regular gasoline is used for the engine, as a result of the comparison of the retard controlling voltage with Vth and the determination of the operating region of the engine.

The flip-flop 51 is set when the output of the AND gate 43 is at the high level whereby the output of the flip-flop 51 becomes the high level while the flip-flop 51 is reset when the output of the reset circuit 52 is at the high level whereby the output of the flip-flop 51 becomes the low level. The reset circuit 52 provides as an output therefrom a high level pulse, e.g. at the starting time of the engine, as shown in FIG. 5(f). The output state of the flip-flop 51 is shown in FIG. 5(g).

At the starting time of the engine, the flip-flop 51 is reset by the reset circuit 52 to provide the low level output signal as above described, which indicates a "premium gasoline mode" in which the conditions of the operating parameters are not changed over. When the output of the AND gate 43 becomes the high level as shown in FIG. 5(e), the output of the flip-flop 51 is changed over to the high level, which indicates a "regular gasoline mode" in which the conditions of the operating parameters are changed over. Thereafter, the regular gasoline mode is retained until the engine is stopped. It is needless to say that if the output of the AND gate 43 does not become the high level after the starting of the engine, the output of the flip-flop 51 remains at the low level, i.e. the premium gasoline mode.

When the output of the flip-flop 51 is inverted from the low level (premium gasoline mode) to the high level (regular gasoline mode), the output voltage of the retard controlling voltage generator 3 is forcedly shifted down in level by a predetermined magnitude towards an advance angle in synchronization with the output of the flip-flop 51 as shown in FIG. 5(b) at point(1). If the output voltage of the retard controlling voltage generator 3 were left as it was at the time of the inversion of the output of the flip-flop 51 towards a retard angle, the ignition timing of the engine would be excessively retarded by the retard control of the voltage generator 3 in addition to the change-over of the reference ignition timing towards a retard angle in the ignition timing controller 61, thereby worsening the drivability of the engine. Accordingly, in order to eliminate such an excessive retard control, the retard controlling voltage is forcedly shifted down towards an advance angle.

The operating parameter change-over portion 6 serves to change over the conditions of the operating parameters depending on the output of the flip-flop 51, i.e. the determined result of whether or not the operating parameter is required to be changed over. The reference ignition timing signal generator 10 provides as an output therefrom the reference ignition timing signal set by the operating condition of the engine such as the speed and the load of the engine. This reference ignition timing characteristic may be determined by e.g. the operating characteristics of the centrifugal governer of a distributor and a pressure diaphram, or may be stored in a memory of an electronic advance controlling device. The reference ignition timing characteristic is automatically changed over in the ignition timing controller 61, which may be formed of a summation circuit of the retard controlling voltage from the generator 3 and of the output of the flip-flop 51 as well as a phase-shifter of the output of the summation circuit, to an advanced reference ignition timing characteristic when premium gasoline is used or to a retarded reference ignition timing characteristic when regular gasoline is used, in accordance with the output of the flip-flop 51, resulting in an optimum reference ignition timing characteristic. It is to be noted that a retard control of the ignition timing controller 61 is well known in the art, the description thereof being hereby omitted.

The supercharging pressure controller 62 detects the inlet air pressure of the engine, monitors at all time whether or not the inlet air pressure is at a set value or less, drives the actuator 64 such that the inlet air pressure may not exceed the set value, and controls the waste gate valve 8, thereby controlling the supercharging pressure at the set value. Also, the supercharging pressure controller 62 changes over the set value of the inlet air pressure to an increased set value when premium gasoline is used, or changes over the set value of the inlet air pressure to a decreased set value when regular gasoline is used, in accordance with the output of the flip-flop 51. It is also to be noted that the method of changing over the supercharging pressure is well known in the art, the description thereof being hereby omitted.

While in the above embodiment, an ignition timing and a supercharging pressure have been exemplified as the operating parameters of the engine, the condition of a compression ratio and/or an air/fuel ratio may well be changed over as the operating parameters of the engine.

Also, while the reset circuit 52 in the above embodiment has been used to generate a pulse at the starting time of the engine, a reset pulse may be generated by the detection of the fact that gasoline has been poured into the gasoline tank of the car through the detection of the opening/closing operation of the fuel cap of a gasoline tank upon supplying the gasoline or through the detection of the change of a fuel gauge. In this case, a backup power source may be added so that the output mode of the flip-flop 51 is memorized even during the stop of the engine.

It is also to be noted that while the reference ignition timing preset in the generator 10 has been described as one for premium gasoline, it may be preset for regular gasoline.

According to the first embodiment of this invention as above described, in the case where either regular gasoline and premium gasoline is used for an engine, knocks are detected by a knock sensor, the ignition timing is retarded according to a retard controlled variable based on the detected result, and the occurrence of knocks is suppressed on a real time basis. At the same time, whether gasoline used for the engine is regular or premium gasoline is determined from the above retard controlled variable, and the determined result is advantageously used to automatically change over the operating parameters of the engine to those of regular or premium gasoline.

Figure 1:
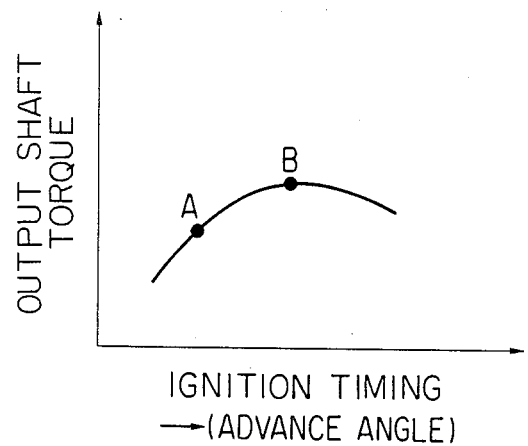
FIG. 1 shows an output shaft torque characteristic of an internal combustion engine as a function of ignition timing.
Figure 2:
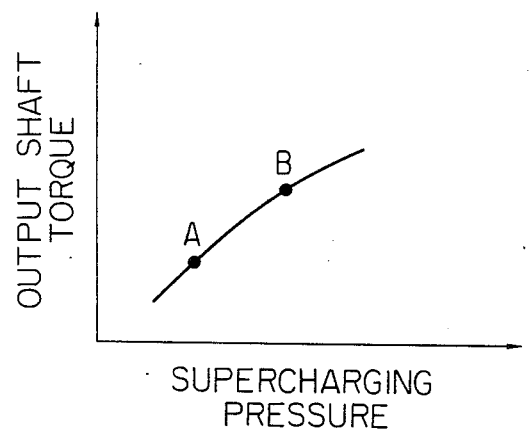
FIG. 2 shows a characteristic curve of output shaft torque in relation to supercharging pressure.
Figure 8:
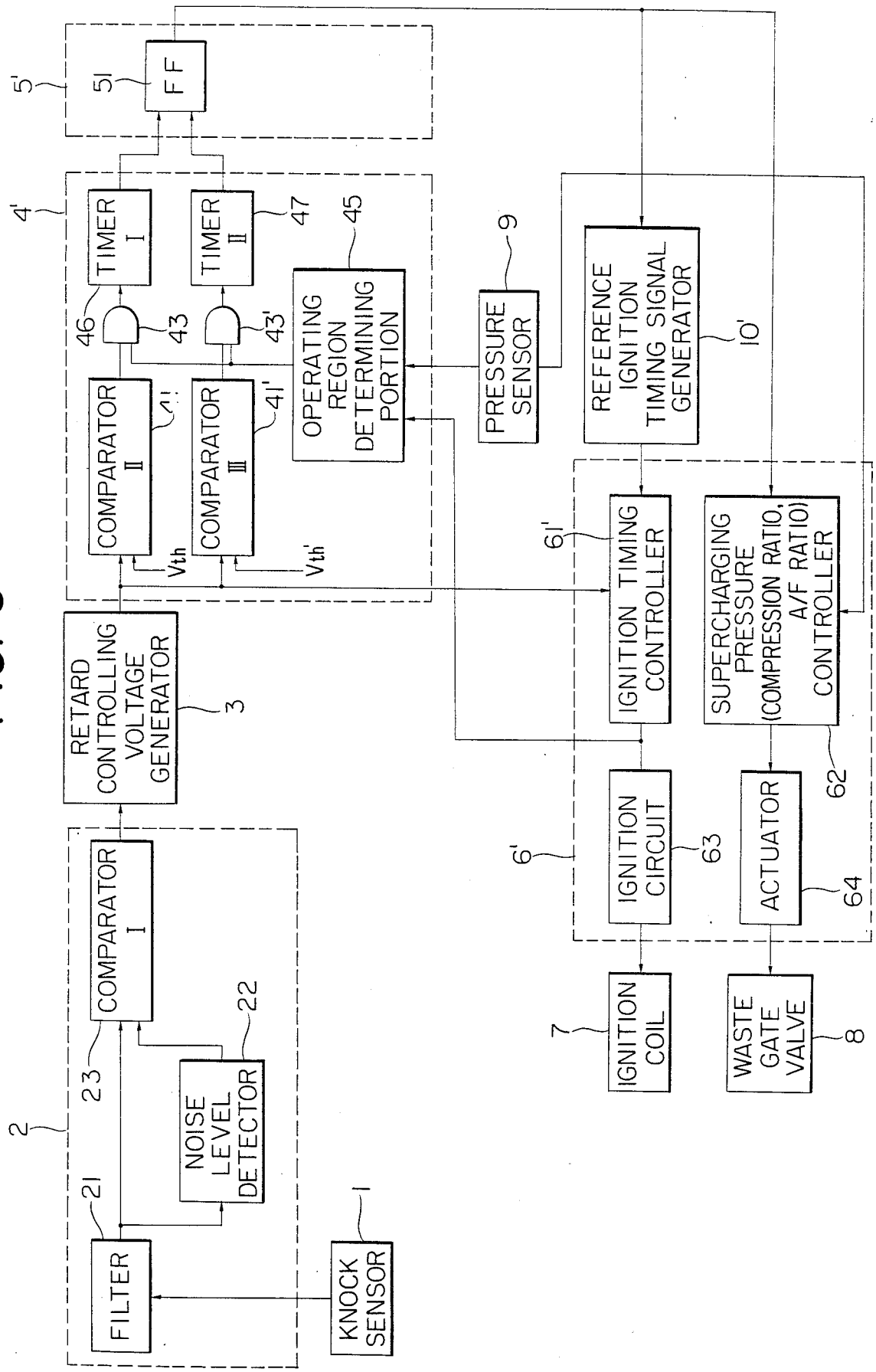
FIG. 8 shows a block diagram of a second embodiment of a control apparatus for an internal combustion engine in accordance with this invention.

A second embodiment of a control apparatus for an internal combustion engine of this invention is shown in FIG. 8. As mentioned above, this second embodiment is to shorten the ignition timing interval for the knock control between points A and B in FIG. 1, thereby enhancing the responsiveness of the knock control. In addition to this, this embodiment can perform a preventive function of erroneous change-over.

In FIG. 8, a reference ignition timing change-over determining portion 4' and a storage portion 5' are provided respectively in lieu of the operating parameter change-over determining portion 4 and the storage portion 5 in the first embodiment shown in FIG. 3. Furthermore, there are provided an operating parameter change-over portion 6' and a reference ignition timing signal generator 10' which are slightly different from the operating parameter change-over portion 6 and the reference ignition timing signal generator 10, respectively. The operating parameter change-over portion 6' is the same as the operating parameter change-over portion 6 except for an ignition timing controller 61' which is slightly different from the ignition timing controller 61 in the first embodiment. The other components are assigned the same reference numerals as those in the first embodiment in FIG. 3 so that the description thereof is not repeated herebelow.

The reference ignition timing change-over determining portion 4' includes second and third comparators 41 and 41', an operating region determining portion 45, first and second AND gates 43 and 43', as well as first and second timers 46 and 47. The second comparator 41 and the third comparator 41' compare the output voltage of the retard controlling voltage generator 3 with a first and a second predetermined voltage levels Vth and Vth', respectively the respective compared results being received as inputs at one terminal respectively of the first and second AND gates 43 and 43'. Two inputs of the operating region determining portion 45 are respectively connected to the outputs of the pressure sensor 9 for detecting the inlet air pressure of the engine and the ignition timing controller 61' while the output of the operating region determining portion 45 is connected to the other terminals respectively of the first and second AND gates 43 and 43'. The output of the first AND gate 43 is connected to the set input of the flip-flop 51 through the first timer 46, and the output of the AND gate 43' is connected to the reset input of the flip-flop 51 through the second timer 47. The output of the flip-flop 51 serves to change over the reference ignition timing to be set in the reference ignition timing signal generator 10' between the reference ignition timings of premium gasoline and regular gasoline. The ignition timing controller 61' serves to phase-shift the reference ignition timing signal from the reference ignition timing signal generator 10' according to the output of the retard controlling voltage generator 3 and then to provide as an output therefrom an ignition signal indicative of the phase-shifted ignition timing to the ignition circuit 63 which causes the ignition coil 7 to develop thereacross a high voltage necessary for the ignition of the engine.

In the second embodiment shown in FIG. 8, the various operations performed until a waveform shown in FIG. 9(b) corresponding to that shown in FIG. 5(b) is obtained as an output from the retard controlling voltage generator 3 are the same as described with reference to the first embodiment shown in FIG. 5 so that the descriptions thereof are omitted.

Figure 9:
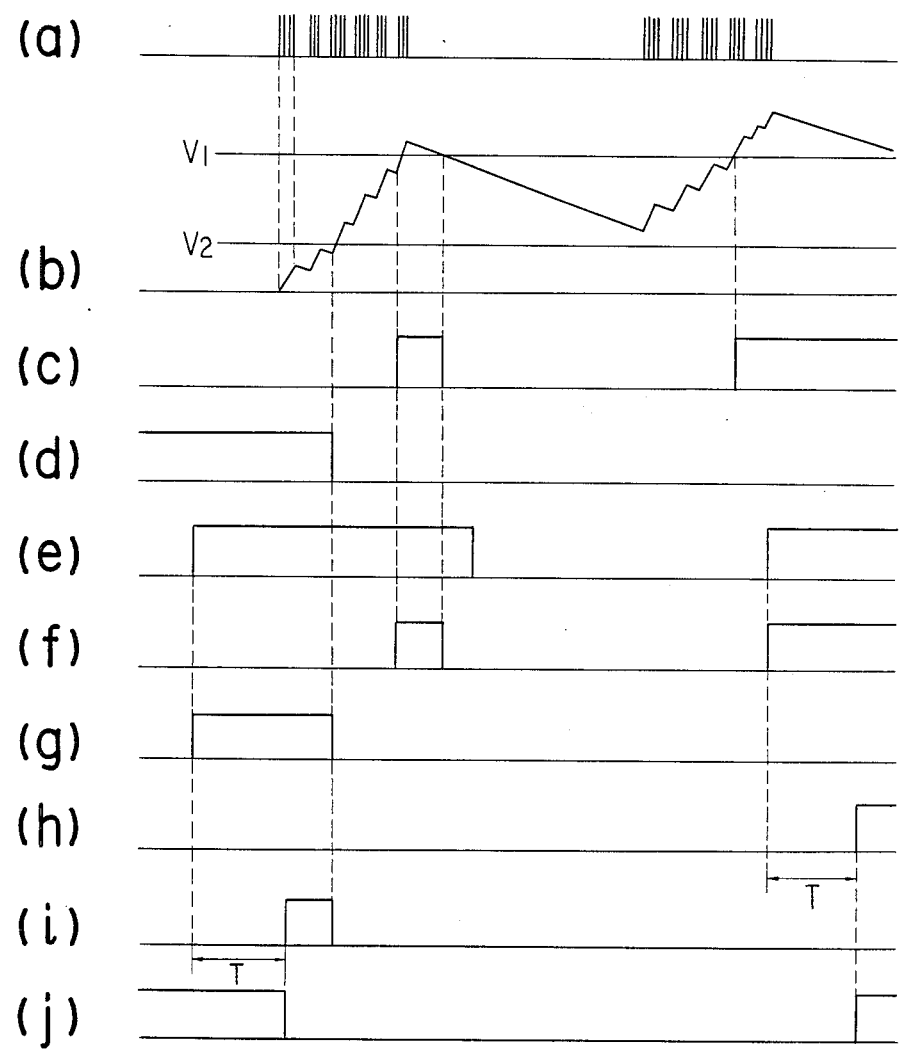
FIGS. 9a–j show waveform graphs for explaining the operations of the various portions of the control apparatus shown in FIG. 8.

The second comparator 41 provides as an output therefrom a high level signal as shown in FIG. 9(c) when the retard controlling voltage from the generator 3 exceeds the first predetermined threshold voltage Vth which is inputed to the comparator 41 for the comparison. The third comparator 41' provides as an output therefrom a high level signal as shown in FIG. 9(d) when the retard controlling voltage from the generator 3 goes below a second predetermined threshold voltage Vth' which is inputed to the comparator 41' for the comparison. It is to be noted that the relationship between Vth and Vth' is preset such that Vth>Vth'.

The threshold level Vth is predetermined such that in the case where the reference ignition timing is set for that of premium gasoline, the retard controlling voltage does not go above Vth when premium gasoline is used while it does not go below Vth when regular gasoline is used, like the first embodiment. The threshold level Vth' is predetermined such that in the case where the reference ignition timing is set for a retarded ignition timing of regular gasoline by the change-over as will be described, the retard controlling voltage does not go above Vth' when premium gasoline is used while it does not go below Vth' when regular gasoline is used.

However, as mentioned in the first embodiment, even though such threshold levels Vth and Vth' are preset to determine which of premium or regular gasoline is used for the engine, this determination can not be necessarily applied to the overall operating region of the engine because for example, in a light load region and in a low speed region the retard controlling voltage may erroneously go above Vth and Vth' even when premium gasoline is used. For the purpose of eliminating such an erroneous determination, the operating region determining portion 45 is provided. The operating region determining portion 45 receives as inputs an operating load information of the engine from the pressure sensor 9 and an operating speed information of the engine through a frequency-voltage conversion of the ignition signal from the ignition timing controller 61' to form a data map for the operating region based on the load and the speed of the engine.

Figure 10:
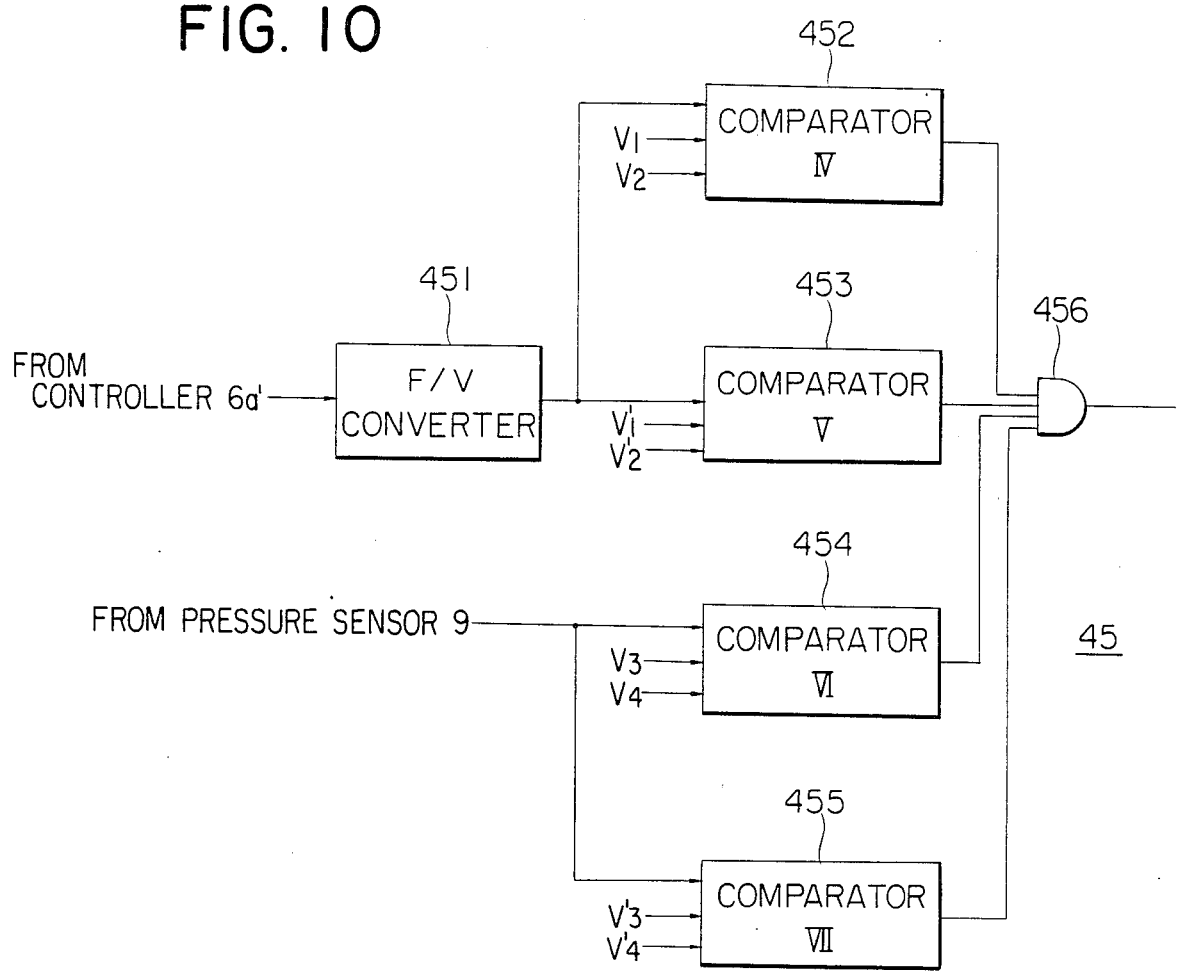
FIG. 10 shows a block diagram of the arrangement of the operating region determining portion used in FIG. 8; and, FIG. 11 shows a map of an operating region of the engine defined by a load information and a speed, used in the second embodiment of this invention.

In FIG. 10, there is shown a block diagram of the arrangement of the operating region determining portion 45 which is composed of a frequency-voltage converter 451, a fourth comparator 452, a fifth comparator 453, a sixth comparator 454, a seventh comparator 455, and an AND gate 456. The input of the F/V converter 451 is connected to the output of the ignition timing controller 61' to convert the ignition signal to a voltage in a frequency-voltage conversion fashion, that is to provide as an output therefrom a voltage proportional to the engine speed. The comparator 452 has two threshold levels V1 and V2 connected thereto, like the comparator 422 in the first embodiment, to be compared with the output voltage of the F/V converter 451. The comparator 453 also has two threshold levels V1' and V2' connected thereto to be compared with the output voltage of the F/V converter 451. Therefore, in the same manner as the first embodiment, when the output voltage of the F/V converter 451 is present between V1 and V2, the comparator 452 provides as an output therefrom a high level signal while otherwise it provides as an output therefrom a low level signal, and when the output voltage of the F/V converter 451 is present between V1' and V2', the comparator 453 provides as an output therefrom a high level signal while otherwise it provides as an output therefrom a low level signal.

The input of the comparator 454 is connected to the output of the pressure sensor 9 to receive as an input a voltage proportional to the inlet air pressure of the engine, that is the load information of the engine. The comparator 454 also has two threshold levels V3 and V4 connected thereto like the comparator 423 in the first embodiment to be compared with the output voltage of the pressure sensor 9. The input of the comparator 455 is also connected to the output of the pressure sensor 9 to receive as an input a voltage proportional to the inlet air pressure of the engine, that is the load information of the engine. The comparator 455 also has two threshold levels V3' and V4' connected thereto to be compared with the output voltage of the pressure sensor 9. Therefore, in the same manner as the first embodiment, when the output voltage of the pressure sensor 9 is present between V3 and V4, the comparator 454 provides as an output therefrom a high level signal while otherwise it provides as an output therefrom a low level signal, and when the output voltage of the pressure sensor 9 is present between V3' and V4', the comparator 455 provides as an output therefrom a high level signal while otherwise it provides as an output therefrom a low level signal. Then, the AND gate 456 whose inputs are connected to the respective outputs of the comparators 452–455 performs the logical multiplication of the outputs of the comparators 452–455.

Figure 11:
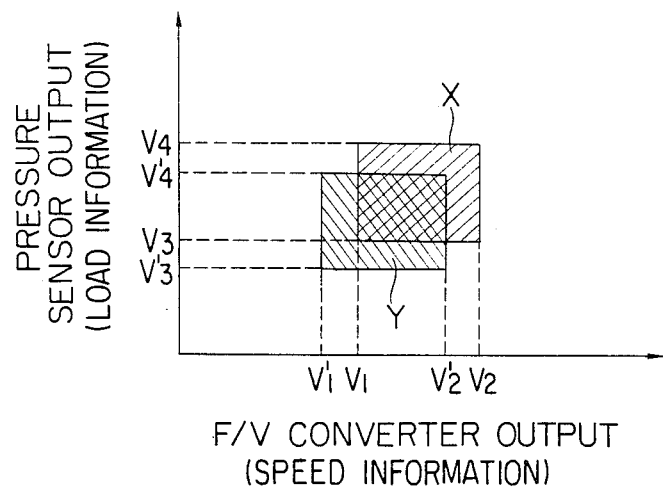

FIG. 11 shows an operating region of the engine represented by the output voltage of the F/V converter 451 (speed information) and the output voltage of the pressure sensor 9 (load information). It will be seen from FIG. 11 that there are two hatched portions X and Y which are called a "map". The hatched portion X designates an operating region defined by a predetermined speed region of V1–V2 as well as a predetermined load region of V3–V4 with the combination of the comparators 452 and 454 while the hatched portion Y designates an operating region defined by a predetermined speed region of V1'–V2' as well as a predetermined load region of V3'–V4' with the combination of the comparators 453 and 455. Therefore, only if the operating region of the engine lies in the double hatched portion, i.e., the superposed portion of the hatched portions X and Y, then the operating region determining portion 45 provides as an output therefrom a high level signal through the AND gate 456, as shown in FIG. 9(e).

Namely, in the case where the reference ignition timing is initially set for premium gasoline in the signal generator 10', when the retard controlling voltage exceeds Vth, indicating that regular gasoline is used for the engine and when the operating condition of the engine lies in the double hatched map shown in FIG. 11, the AND gate 43 provides as an output therefrom a high level signal, as shown in FIG. 9(f). On the other hand, in the case where the reference ignition timing is initially set for regular gasoline in the signal generator 10', when the retard controlling voltage becomes lower than Vth' indicating that premium gasoline is used for the engine and when the operating condition of the engine lies in the double hatched map shown in FIG. 11, the AND gate 43' provides as an output therefrom a high level signal, as shown in FIG. 9(g).

Thus, the AND gate 43 or 43' provides as an output therefrom a signal accurately indicative of whether premium gasoline or regular gasoline is used for the engine, as a result of the comparison of the retard controlling voltage with Vth and the determination of the operating region of the engine.

Namely, the AND gate 43 for logically multiplying the outputs of the second comparator 41 and the operating region determining portion 45 provides as an output therefrom a signal accurately indicative of whether premium gasoline or regular gasoline is used for the engine in reference ignition timing for the premium gasoline, as a result of the comparison of the retard controlling voltage with V1. That is to say, when regular gasoline is used, the output signal of the AND gate 43 becomes the high level as shown in FIG. 9(f). The AND gate 43' for logically multiplying the outputs of the third comparator 41' and the operating region determining portion 45 provides as an output therefrom a signal accurately indicative of whether premium gasoline or regular gasoline is used for the engine in the reference ignition timing for regular gasoline, as a result of the comparison of the retard controlling voltage with V2. That is to say, when premium gasoline is used, the output signal of the AND gate 43' becomes the high level as shown in FIG. 9(g).

Since knocks easily arise in such an operating condition as a rapid acceleration of the engine where a fuel control and the like become unstable, there may be a danger that the retard controlling voltage exceeds Vth or Vth' only instantaneously even in the above operating regions X and Y when premium gasoline is used, so that the output of the flip-flop 51 is inverted, thereby providing as an output therefrom an erroneous change-over determination. Hence, when the output signals of the AND gates 43 and 43' do not continue for more than a predetermined time interval, such an instantaneous error determination signal can be prevented from being provided to the flip-flop 51 in the presence of the first and second timers 46 and 47.

In FIG. 9(h), the operation of the first timer 46 is shown, and in FIG. 9(i), the operation of the second timer 47 is shown. The first timer 46 provides as an output therefrom a high level signal from the moment when a predetermined time T has lapsed after the rising transition of the output signal of the AND gate 43 to the moment when the output signal of the AND gate 43 has become the low level. The second timer 47 performs a similar operation as the first timer 46 in relation to the output signal of the second AND gate 43'. Therefore, an instantaneous output signal of the AND gate 43 or 43' is prevented from erroneously passing to the flip-flop 51 through the timer 46 or 47, respectively. The flip-flop 51 is therefore not operated by an erroneous determination signal in the presence of the timers 46 and 47 as shown in FIG. 9(j), providing an accurate ignition timing change-over signal.

The reference ignition timing signal generator 10' provides as an output therefrom the reference ignition timing signal set by the operating condition of the engine such as the speed and the load of the engine. As above mentioned in the first embodiment, this reference ignition timing characteristic may be determined by e.g. the operating characteristics of the centrifugal governer of a distributor and a pressure diaphram, or may be stored in a memory of an electronic advance controlling device. The reference ignition timing characteristic is automatically changed over by the output of the flip-flop 51, and in the ignition timing controller 61' the reference ignition timing is further advanced when premium gasoline is used or retarded when regular gasoline is used, according to the output of the retard controlling voltage generator 3, resulting in an optimum reference ignition timing characteristic. It is to be noted that the ignition timing controller 61' may be formed of a summation circuit and a phase-shifter like the ignition timing controller 61.

In the same manner as the first embodiment, the supercharging pressure controller 62 detects the inlet air pressure of the engine, monitors at all time whether or not the inlet air pressure is at a set value or less, drives the actuator 64 such that the inlet air pressure may not exceed the set value, and controls the waste gate valve 8, thereby controlling the supercharging pressure at the set value. Also, the supercharging pressure controller 62 changes over the set value of the inlet air pressure to an increased set value when premium gasoline is used, or changes over the set value of the inlet air pressure to a decreased set value when regular gasoline is used, in accordance with the output of the flip-flop 51. It is also to be noted that the method of changing over the supercharging pressure is well known in the art, the description thereof being hereby omitted.

While in the above second embodiment, an ignition timing and a supercharging pressure have been exemplified as the operating parameters of the engine, the condition of a compression ratio and/or an air/fuel ratio may well be changed over as the operating parameters of the engine.

According to the second embodiment as above mentioned, the occurrence of knocks can be suppressed with a high responsiveness to improve the drivability of the engine while at the same time, the change-over operation is not made unless a determination signal of whether or not the change-over of the reference ignition timing is required lasts for most than a predetermined time interval whereby an ignition timing change-over due to an instantaneous error determination can be advantageously precluded.

It is to be noted that while the present invention has been described with reference to the above embodiments illustrated in the accompanying drawings, it should not be limited to them but may be applied with various modifications thereof without departing from the spirit of the invention.

What we claim is:

1. A control apparatus for an internal combustion engine having a reference ignition timing comprising:
    a sensing means for sensing vibrations including knocks of said engine;
    knock signal deriving means for deriving knock signals from the output of said sensing means;
    a correction magnitude determining means for determining from said knock signals derived by said knock signal deriving means an ignition timing correction magnitude for suppressing the occurrence of knock;
    an operating parameter condition sensing means;
    an operating parameter change-over determining means for determining a change-over of operating parameter of said engine from the ignition timing correction magnitude and an operating parameter condition of said engine from said parameter condition sensing means;
    a storage means for storing the output of said operating parameter change-over determining means; and
    an operating parameter change-over means for controllably changing over the condition of the operating parameter of said engine to suppress said knocks of said engine in accordance with the output of said storage means.

2. A control apparatus for an internal combustion engine as claimed in claim 1 wherein said operating parameter includes an ignition timing characteristic for said engine.

3. A control apparatus for an internal combustion engine as claimed in claim 1 wherein said operating parameter is a supercharging pressure.

4. A control apparatus for an internal combustion engine as claimed in claim 1 wherein said operating parameter change-over determining means includes means for determining the change-over of the operating parameter of said engine only in a predetermined operating region of said engine.

5. A control apparatus for an internal combustion engine as claimed in claim 1 wherein said correction magnitude determining means includes means for determining an ignition timing retard angle to shift the retard angle by a predetermined angle toward an advance angle when the output of said storage means is inverted toward the suppression of knocks.

6. A control apparatus for an internal combustion engine having a reference ignition timing comprising:
  a sensing means for sensing vibrations including knocks of said engine;
  knock signal deriving means for deriving knock signals from the output of said sensing means;
  a correction magnitude determining means for determining from said knock signals derived by said knock signal deriving means an ignition timing correction magnitude for suppressing the occurrence of knock;
  an operating parameter condition sensing means;
  an operating parameter change-over determining means for determining a change-over of operating parameter of said engine from the ignition timing correction magnitude and an operating parameter condition of said engine from said parameter condition sensing means;
  a storage means for storing the output of said operating parameter change-over determining means;
  an operating parameter change-over means for controllably changing over the condition of the operating parameter of said engine to suppress said knocks of said engine in accordance with the output of said storage means;
  said operating parameter change-over means including a reference ignition timing signal generator for generating said reference ignition timing being set for gasoline with a particular octane rating, and an ignition timing controller for phase-shifting the reference ignition timing of said generator according to the outputs of said correction magnitude determiing means and said storage means to control an ignition circuit connected to an ignition coil.

7. A control apparatus for an internal combustion engine as claimed in claim 6 wherein said operating parameter change-over determining means includes a comparing means for comparing the output of said correction magnitude determining means with a first predetermined threshold level set higher than the output of said correction magnitude determining means when premium gasoline is used, a pressure sensor for sensing the inlet air pressure of said engine, an operating region determining means responsive to the outputs of said pressure sensor and said ignition timing controller for determining the operating region of said engine, and means for logically multiplying the outputs of said comparing means and said operating region determining means.

8. A control apparatus for an internal combustion engine as claimed in claim 7 wherein said operating region determining means comprises a single map of the operating region of said engine in which knocks may occur.

9. A control apparatus for an internal combustion engine as claimed in claim 7 wherein said operating parameter change-over means further includes a supercharging pressure controller responsive to the outputs of said storage means and said pressure sensor for controlling a supercharging pressure actuator connected to a waste gate valve.

10. A control apparatus for an internal combustion engine as claimed in claim 6 wherein said operating parameter change-over determining means includes a first comparing means for comparing the output of said correction magnitude determining means with a first predetermined threshold level set higher than the output of said correction magnitude determining means when a premium gasoline is used, a pressure sensor for sensing the inlet air pressure of said engine, a second comparing means for comparing the output of said correction magnitude determining means with a second predetermined threshold level set higher than the output of said correction magnitude determining means when a premium gasoline is used, an operating region determining means responsive to the outputs of said pressure sensor and said ignition timing conroller for determining the operating region of said engine, a first multiplication means for logically multiplying the outputs of said first comparing means and said operating region determining means, and a second multiplication means for logically multiplying the outputs of said second comparing means and said operating region determining means.

11. A control apparatus for an internal combustion engine as claimed in claim 10 wherein said operating region determining means comprises a superposed map of two operating regions of said engine in which knocks may occur.

12. A control apparatus for an internal combustion engine as claimed in claim 11 wherein said storage means comprises a flip-flop having set and reset input terminals.

13. A control apparatus for an internal combustion engine as claimed in claim 12 wherein said first and second multiplication means are respectively connected to the set and the reset input terminals of said flip-flop.

14. A control apparatus for an internal combustion engine as claimed in claim 12 wherein said first and second multiplication means are respectively connected to the set and the reset input terminals of said flip-flop respectively through first and second timers which serve to prevent the outputs of said first and second multiplication means from being passed therethrough for a predetermined time interval.

* * * * *